United States Patent [19]

Myers

[11] Patent Number: 4,836,707
[45] Date of Patent: Jun. 6, 1989

[54] RELEASABLE CLAMPING APPARATUS

[75] Inventor: W. Neill Myers, Huntsville, Ala.

[73] Assignee: The United States of America as represented by the United States National Aeronautics and Space Administration, Washington, D.C.

[21] Appl. No.: 93,417

[22] Filed: Sep. 4, 1987

[51] Int. Cl.⁴ .................. F16B 21/02; E05C 9/10
[52] U.S. Cl. .................... 403/322; 403/325; 403/328; 292/27; 292/34; 24/635
[58] Field of Search .......... 403/322, 324, 325, 321, 403/330, 327, 315, 409.1, 328, 319; 292/46, 52, 11, 27, 34; 24/635, 651

[56] References Cited

U.S. PATENT DOCUMENTS

| | | | |
|---|---|---|---|
| 943,127 | 12/1909 | Van Boven | 403/325 |
| 1,252,776 | 1/1918 | Camper | 292/27 |
| 2,118,729 | 5/1938 | Hogan | 292/27 |
| 2,443,396 | 6/1948 | McEwen | 292/34 |
| 2,448,817 | 9/1948 | McArthur | 403/321 |
| 3,043,614 | 7/1962 | Eichmann | 403/321 |
| 3,346,224 | 10/1967 | Rollins | 403/322 X |
| 3,469,872 | 9/1969 | Damm et al. | 403/325 |
| 3,561,802 | 2/1971 | Brockway | 292/27 X |
| 4,404,714 | 9/1983 | Duran | 403/328 X |
| 4,500,120 | 2/1985 | Ridgewell et al. | 292/27 X |
| 4,554,907 | 11/1985 | Overley et al. | 292/27 X |

Primary Examiner—Peter M. Cuomo
Attorney, Agent, or Firm—William J. Sheehan; John R. Manning; Charles E. B. Glenn

[57] ABSTRACT

In accordance with this invention, a releasable clamping apparatus (10) is constructed having an opening or slot (14) within which a lifting handle (28 or 30) is clamped between retaining latch portions (62, 64) and a clamp assembly (34). The latch portions (62, 64) are supported by openings (56, 58) and are retracted and extended into a slot (14) by spring biased linkage members (78, 80). These members (78, 80) are acted upon by similarly profiled cam lobes (116, 116a, 118, 118a). Dissimilarly profiled cam lobes (126, 128) of the cam member (110) act upon the clamp assembly (34), clamping a handle (28 or 30) against faces (68) of the latch portions (62, 64). The cam member (110) is coupled to a shaft (162) having an operating handle (32), with the shaft (32) also being provided with a detent assembly (202). This detent assembly (202) locks the handle (32) and the shaft (162) in "locked" positions (38 or 40) in the surface (198) of the apparatus (10), which clamps a handle (28 or 30) as described. When the handle (32) is rotated to position the detent assembly (202) in one of the "release" openings (42, 44), the clamp assembly (34) and the latch portions (62, 64) are withdrawn into their respective openings, releasing the handle (28 or 30).

8 Claims, 4 Drawing Sheets

RELEASABLE CLAMPING APPARATUS

ORIGIN OF THE INVENTION

The invention described herein was made by an employee of the United States Government and may be manufactured and used by or for the Government for Government purposes without the payment of any royalties thereon or therefor.

TECHNICAL FIELD

This invention relates generally to clamping and unclamping devices, and more particularly to such a device which is adjustable to accommodate differently sized lifting handles mounted on components to be lifted into space by devices such as the Remote Manipulator Arm of the Space Shuttle.

BACKGROUND OF THE INVENTION

One of the tasks involved with maintaining a space telescope while the telescope is in a space environment is the replacement of spent components, such as batteries, and resupply of cryogenic components, such as liquid helium. These replacement components and supplies are stored in the cargo bay of the Space Shuttle and tansported to a point in space adjacent the telescope. A Remote Manipulator Arm mounted in the cargo bay is equipped with a bar or rod which, in a typical case, has three clamping and unclamping devices mounted to the bar in a manner which allows the clamping and unclamping devices to be adjustable across the length of the bar and also to be rotatable once positioned on the bar.

When smaller components of the telescope are to be replaced, two of the devices are clamped to a lifting handle of two discrete components, leaving the third device empty. The Remote Manipulator Arm is then operated to lift the two components out of the cargo bay and position them near the telescope. Once in position, an astronaut removes a spent component and clamps it to the empty device and thereafter removes a replacement component from the bar and inserts it into the telescope. This process is repeated, leaving two spent components clamped to devices on the bar, with these spent components being replaced in the cargo bay for return to Earth, where the components are refurbished or discarded.

Larger components, some being approximately the size of a phone booth and possessing a substantial amount of mass, are equipped with a plurality of lifting handles (typically three), with at least one of these handles being oriented out of plane to the others for stability. In this case, the devices on the bar are adjusted along the length of the bar and rotated to match the configuration of lifting handles on the component to be replaced. After this is accomplished, the Remote Manipulator Arm is operated to position the bar adjacent the telescope, where an astronaut removes the spent component and clamps it to the devices on the bar. The spent component is then moved to the cargo bay and stowed, after which a replacement component is clamped to the devices and positioned near the telescope. An astronaut then unclamps the replacement component and inserts it into the telescope.

Various problems have been encountered in the testing of clamping and unclamping devices used to date because the components are equipped with lifting handles of two different thicknesses, these thicknesses being typically $\frac{1}{4}''$ and $\frac{3}{4}''$. Further, these thicknesses vary as much as ±0.030" between handles of the same relative size. In order to compensate for these differences, previously suggested clamping devices required the astronaut to modify the clamping device, while in space, to accommodate the particular handle of a component being replaced. This task of modifying the clamping device occupied time which could be more constructively utilized. Further, the designs of the suggested clamping devices were not able to securely hold the lifting handles of the components because of the minor variations in handle thicknesses. As stated, because some of the components to be replaced are particularly large and cumbersome (approximately the size of a phone booth), large loads were imposed on the clamping devices by a leverage effect. In some cases, these loads were able to force open the latches of the clamping devices, freeing the handles and allowing the component to drift free, an obviously dangerous situation.

It is, therefore, an object of this invention to provide a clamping device which requires no modification by an astronaut and which will securely grip a lifting handle of a component.

It is a further object of this invention to provide a clamping device in which the latches cannot be forced open and which is simple in its use, requiring only one hand to operate.

SUMMARY OF THE INVENTION

In accordance with this invention, a housing is provided with a slot or opening in one end for engaging a lifting member with this opening, in turn being provided with a releasable latching apparatus having retaining members thereon which extend into the opening. A clamp is provided in the housing for clamping the lifting member against the retaining member, with the clamp and latching apparatus being responsive to rotation of a cam. This cam is provided with a plurality of lobes for operating the clamp and latching apparatus is further provided with means for rotation thereof.

DETAILED DESCRIPTION OF THE DRAWINGS

Figure 1:
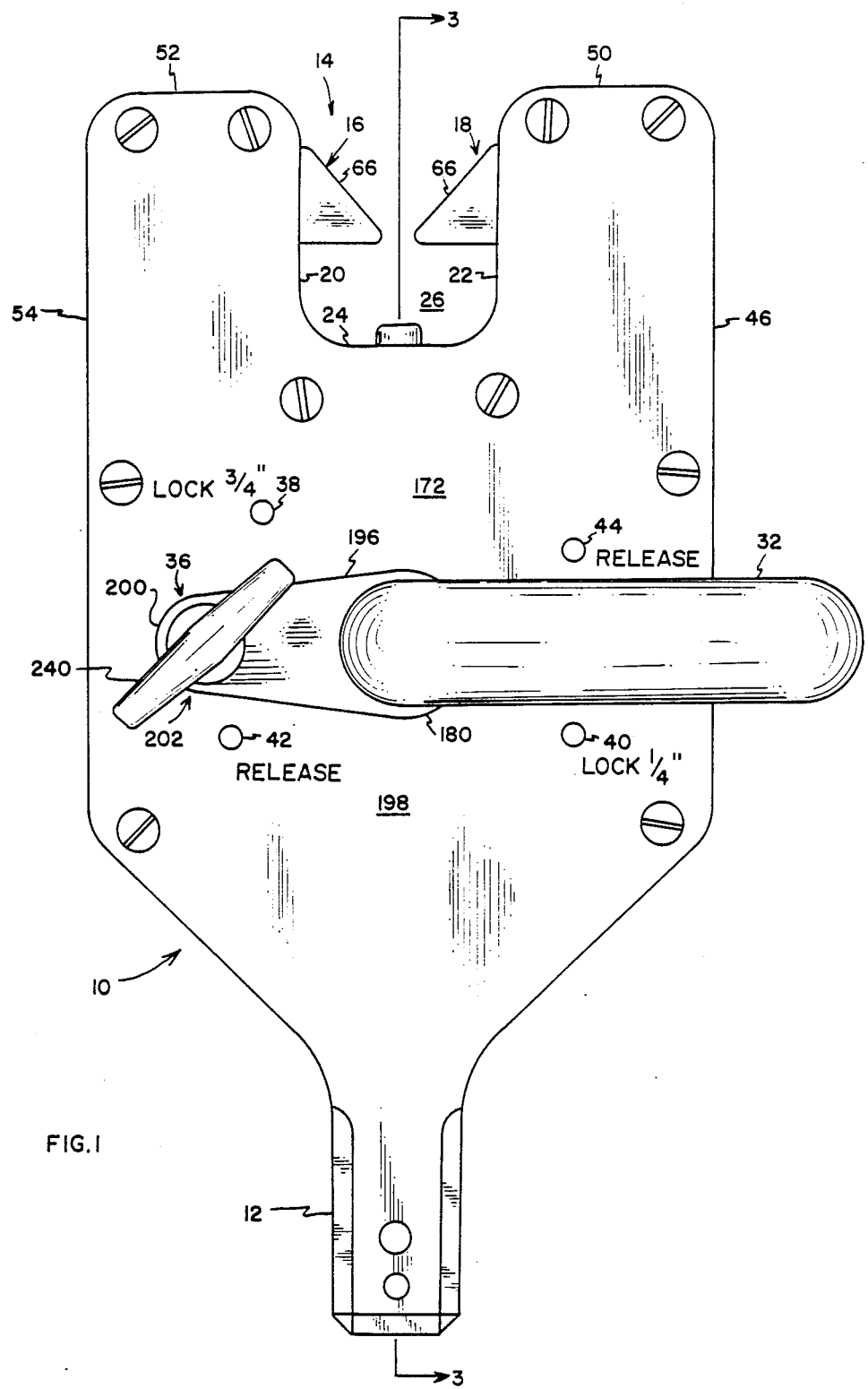
FIG. 1 is an elevational view of a top side of a clamping device illustrating external components of this invention.
Figure 2:
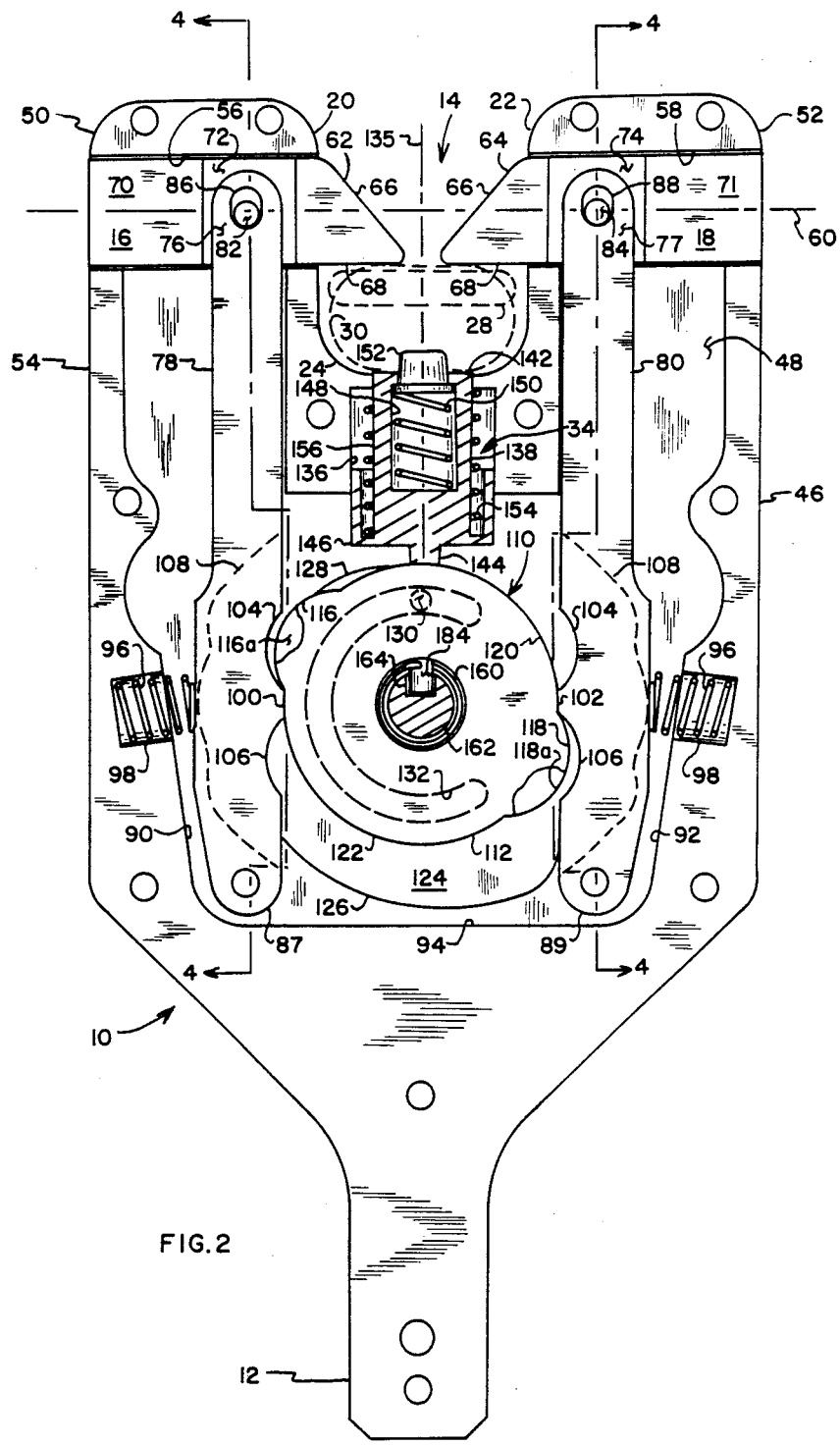
FIG. 2 is an elevational view, with an upper cover plate removed, illustrating internal components of the clamping device and dotted line positions of lifting handles to be clamped.

Referring initially to FIGS. 1 and 2, a clamping device 10 is illustrated which is mounted by end 12 to a bar (not shown) mounted to the operative end of the Remote Manipulator Arm (not shown) carried in the cargo bay of the Space Shuttle (not shown). Clamping device 10 is constructed having an elongated slot or opening 14 having a pair of spring biased retaining latch assemblies 16 and 18 which, together with side walls 20 and 22 and end wall 24 of slot 14, define a clamping region 26 therebetween. As shown, dotted line positions 28 and 30 (FIG. 2) illustrate two configurations of lifting handle members ($\frac{1}{4}$″) and $\frac{3}{4}$″) with which this invention is primarily concerned, but other configurations of lifting handles may be accommodated by altering the shape of slot 14. An operating handle 32 operates latch assemblies 16 and 18 and a clamp assembly 34 (FIG. 2), with a detent assembly 36 engaging one of "lock" openings 38 and 40 or "release" openings 42 and 44, locking or unlocking handle 32 in a selected position, as will be described hereinafter.

Figure 3:
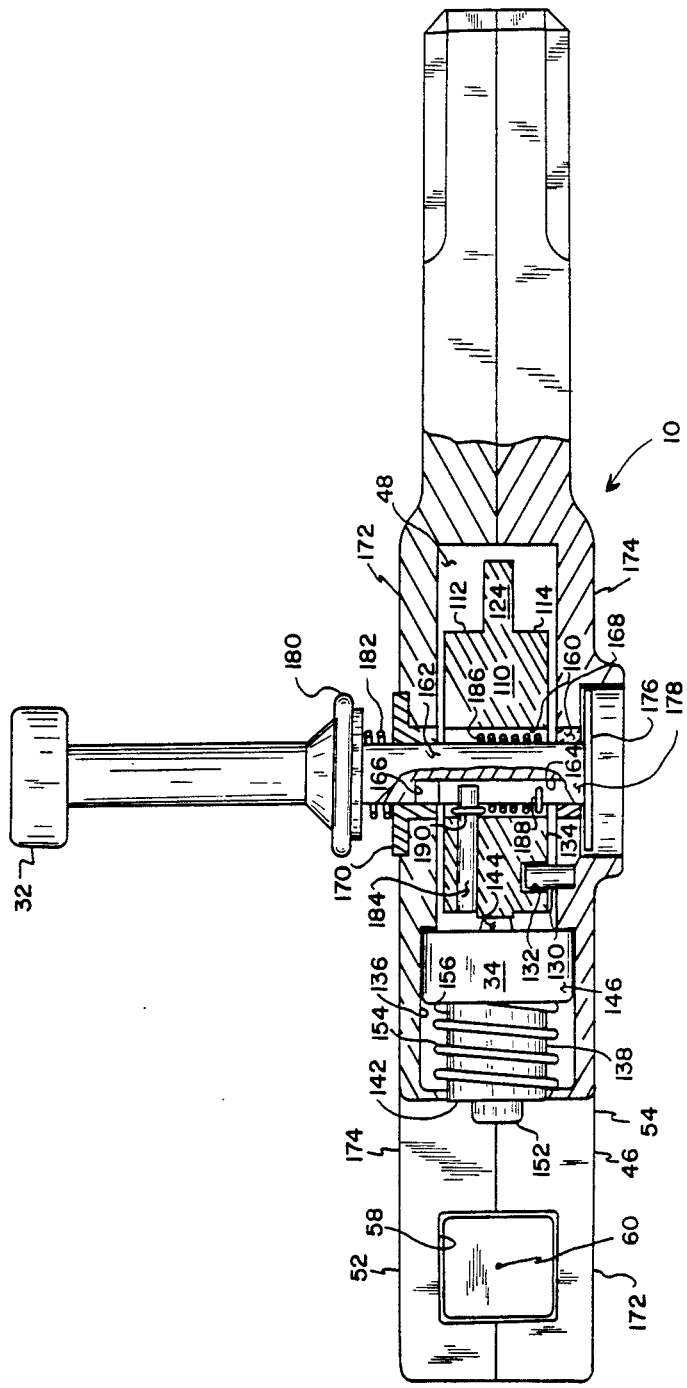
FIG. 3 is a sectional view taken along line 3—3 of FIG. 1.

Referring now to FIGS. 2 and 3, which reveal interior details of clamping device 10, it is seen that device 10 has a generally flat housing 46 having a hollow interior 48. A pair of extensions 50 and 52 on end 54 of housing 46 extends outward to form elongated slot 14 therebetween. Opposed openings 56 and 58 are positioned in side walls 20 and 22 and have a common axis 60, which extends perpendicular to slot 14 through openings 56 and 58. For retaining a lifting handle in slot 14, openings 56 and 58 are provided with latch assemblies 16 and 18, which are laterally movable therein. Latch assemblies 16 and 18 are each constructed having retaining latch portions 62 and 64 which extend into slot 14, and each has an angled outer face 66 and an inner face 68 against which one of lifting handles 28 or 30 (dotted lines) is clamped.

To provide a means for laterally moving latch assemblies 62 and 64 into and out of slot 14, a pair of spring biased pivot links 78 and 80 (FIGS. 2 and 4) are pivotally maounted in hollow interior 48 of housing 46 at ends 87 and 89, respectively, of each link. Latch assemblies 16 and 18 are pivotally coupled to links 78 and 80 by pins 82 and 84, respectively, which engage elongated openings 86 and 88 of links 78 and 80, respectively. As seen in FIG. 2, latch assemblies 16 and 18 include inner portions 70 and 71, which support latch assemblies 16 and 18 in openings 56 and 58. Inner portions 70 and 71 are each provided with opposed slots 72 and 72a and 74 and 74a, respectively (FIG. 4), which provide clearance for forked ends 76 and 77 of links 78 and 80.

Figure 4:
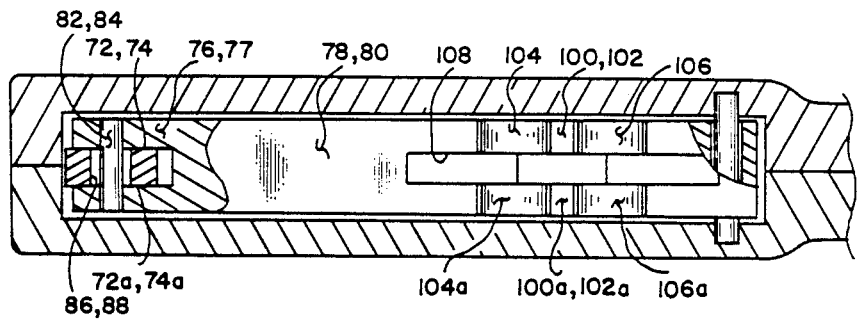
FIG. 4 is a sectional view taken along each set of lines 4—4 of FIG. 2 and is representative of symmetrical components of this invention.

For inwardly biasing links 78 and 80, each of links 78 and 80 is provided with a spring 96 adjacent ends 87 and 89, and each spring is set in a recess 98 of housing 46. These springs bias links 78 and 80 and latch portions 62 and 64 to an inward, normally latched position of latch assemblies 16 and 18. Links 78 and 80, as shown in FIGS. 2 and 4, are each further provided with a pair of aligned cam followers 100 and 100a and 102 and 102a, which are positioned between semi-circular regions 104 and 104a and 106 and 106a in each of links 78 and 80. A cutout 108 (dotted lines in FIG. 2) longitudinally cut into each of links 78 and 80 provides clearance for an intermediate lobe 126 of a cam member 110 during operation of the device.

For imparting movement to links 78 and 80 of clamp assembly 34, cam member 110, as shown in FIGS. 2 and 3, is constructed having like upper and lower cams 112 and 114 having like profiled lobes 116 and 116a and 118 and 118a, respectively, with lobes 116 and 118 being partially cut away in FIG. 2 in order to show these lobes. Lobes 116 and 116a are aligned and are radially positioned 180° from aligned lobes 118 and 118a. Cam regions 120 and 122 between these lobes are radially circular. Lobes 116 and 116a and 118 and 118a bear on followers 100 and 100a and 102 and 102a, respectively, of links 78 and 80, providing lateral movement to links 78 and 80. Positioned between upper and lower cams 112 and 114 is an intermediate connecting cam 124, which has two disimilarly profiled lobes 126 and 128. These lobes 126 and 128 are radially positioned approximately 180° from each other and are radially positioned approximately 90° with respect to lobes 116 and 116a and 118 and 118a.

Intermediate cam 124 provides movement to cylindrical clamping assembly 34, which is slidably positioned about an axis 135 of a bore 136 centrally positioned in end wall 24 of slot 14. Assembly 34 is constructed having a cylindrical body 138, which in turn has a clamp end 142 and a cam follower 144 on an opposite end 146. Assembly 34 has a hollow interior 148 within which a spring 150 biases a button cap 152 toward latch assemblies 16 and 18. A second spring 154 positioned around exterior 156 of assembly 34 biases follower 144 against intermediate cam 124.

For providing means for clamping lifting handles of various thicknesses, lobe 128 of intermediate cam 124 is profiled to urge clamp assembly 34 into slot 14 a distance which clamps the thicker handle 30 ($\frac{3}{4}$″) against latches 16 and 18, while lobe 126 of cam 124 is profiled to urge clamp assembly 34 a further distance to clamp the thinner handle 28 ($\frac{1}{4}$″) against latches 16 and 18. This, of course, is dependent on rotating cam member 110 in a clockwise direction (FIG. 2) when either of the aforementioned lobes 126 and 128 of intermediate cam 124 are positioned against clamp assembly 34. While clamp assembly 34 is being acted upon as described, followers 102 and 102a and 104 and 104a of links 78 and 80 ride on circular regions 120 and 122 of upper and lower cams 112 and 114, allowing latches 16 and 18 to remain biased at a latched position in slot 14. Conversely, when lobes 102 and 102a and 104 and 104a of upper and lower cams 112 and 114, respectively, are positioned to act against followers 102 and 102a and 104 and 104a of links 78 and 80, clamp assembly 34 is biased against a circular portion of intermediate cam 124. This allows clamp assembly 34 to remain biased at an innermost position in bore 136 while links 78 and 80 are forced apart, retracting latches 16 and 18 from slot 14.

Figure 6:
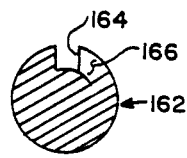
FIG. 6 is a sectional view taken along line 6—6 of FIG. 5.

For providing rotational movement to cam member 110, a central opening 160 extends therethrough, and a shaft 162 having a longitudinal slot 164 and a circumferential slot 166 are positioned in opening 160 as shown in FIGS. 2, 3, and 6. Shaft 162 is slidably supported by bushings 168 and 170, which are set in broad opposite sides 172 and 174 of housing 46. Shaft 162 is retained in side 174 by a retaining plate 176 connected to lower end 178 of shaft 162. Shaft 162 is retained in opposite side 172 of housing 46 by a collar 180 spaced from side 172, and a compression spring 182 is positioned between collar 180 and side 172. Spring 182 biases retaining plate 176 against lower side 174 of housing 46. Shaft 162 is connected to operating handle 32, which is positioned 90° to longitudinal slot 164. A pin 184 (FIGS. 2 and 3) set in cam member 110 extends normally as shown into opening 160 and engages longitudinal slot 164 of shaft 162. Pin 184 transfers rotational movement from shaft 162 to cam member 110 while allowing shaft 162 to be pushed by handle 32 through housing 46 and cam member 110 (until collar 180 abuts bushing 170), at which point circumferential slot 166 in shaft 162 and pin 184 become aligned. This effectively decouples shaft 162 from cam member 110, with further rotation of shaft 162 in this depressed position causing pin 184 to ride in circumferential slot 166. With pin 184 engaged in circumferential slot 166, a "soft" coupling between shaft 162 and cam member 110 is provided by a torsion spring 186 positioned around shaft 162 within opening 160 of cam member 110. Torsion spring 186 has one end 188 anchored in longitudinal slot 164, with an opposite end 190 being looped around pin 184. This "soft" connecting configuration between shaft 162 and cam member 110 provides compensation for minor differences in lifting handle thicknesses, as will be explained.

Figure 5:
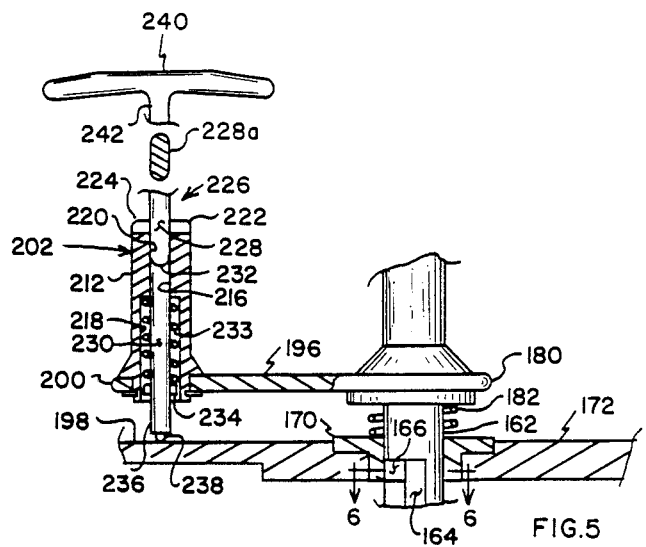
FIG. 5 is a partial sectional view illustrating particular details of a detent assembly of this invention.

Referring now to FIGS. 1 and 5, an extension 196 is shown connected to collar 180, with extension 196 extending as shown over exterior 198 of housing 46. Positioned on end 200 of extension 196 is a detent assembly 202 having a detent shaft 226, which locks into one of "lock" openings 38 and 40 or "release" openings 42 and 44, locking handle 32 and the described internal components of device 10 in predetermined positions. With detent assembly 202 in the "lock ¾" opening 38, cam member 110 (FIG. 2) is in the position shown, with intermediate lobe 128 urging clamp assembly 34 against the larger size (¾" thick) lifting handle 30, clamping it against latches 16 and 18. With detent 202 in the "lock ¼" opening 40, cam member 110 is positioned 180° to that shown in FIG. 2, which causes intermediate lobe 126 to urge clampp assembly 34 against the smaller (¼" thick) lifting handle 28, clamping it against latches 16 and 18. In order to release either of lifting handles 28 or 30 from the clamped position, detent assembly 202 is disengaged from one of openings 38 or 40 and moved by operating handle 32 to the adjacent "release" opening. This rotates cam member 110 to a point where upper and lower lobes 116 and 116a and 118 and 118a bear on link followers 100 and 100a and 102 and 102a, respectively, moving latches 16 and 18 laterally in opposite directions out of slot 14 and releasing either of lifting handles 28 or 30.

Detent assembly 202 is constructed having a generally tubular housing 212 mounted at end 200 of extension 196. Housing 212 extends normal to exterior 198 of device 10 and has a hollow interior 216 configured having a lower cylindrical-shaped region 218 and an upper elongated (in cross section) region 220. A groove 222 is cut into upper end 224 of housing 212, this groove being positioned 90° to elongated region 220. A detent shaft 226 is fitted into interior 216 of housing 212 and has a matching elongated (in cross section) upper region 228 (this elongated region being illustrated by reference number 228a) and a rod-shaped lower region 230. Shoulders 232 are provided on shaft 226 where upper region 228 and lower region 230 transition. A spring 233 positioned in lower region 218 of housing 212 applies force against a collar 234 fitted around lower end 236 of shaft 226, which enables detent end 238 of shaft 226 to be biased into one of openings 38, 40, 42, and 44. A handle 240 fitted on opposite end 242 of shaft 226 provides convenient means by which shaft 226 may be raised against spring 233. Upon rotating handle 240 (and thus shaft 226) 90° whenever shaft 226 is raised as described, shoulders 232 may be engaged in groove 222, locking detent end 238 of shaft 226 in a raised position above exterior 198 of housing 212.

In operation, a plurality of devices 10 are rotatably attached to a bar or rod (not shown) which is adjustable in length. While it is contemplated that an adjustable bar is to be used in conjunction with a plurality of devices 10, other structures may be used to support these devices. This bar is mounted to a Remote Manipulator Arm (not shown) mounted in the cargo bay of the Space Shuttle (not shown) and transported into space along with replacement components for a satellite. Once the Shuttle is in position adjacent the satellite, an astronaut loads smaller components by their lifting handles 28 or 30 (FIG. 2) to discrete ones of devices 10, leaving one of devices 10 on the bar empty. The components are then conveniently positioned next to the satellite where the astronaut removes a spent component from the satellite and couples it to the empty device 10. He then removes an appropriate replacement component and connects it to the satellite. This process is repeated until the spent components are clamped to devices 10 and the replacement components are in place aboard the satellite. The spent components are then stowed in the cargo bay. Larger components to be replaced, which may range up to the size of a phone booth, are equipped with a plurality of lifting handles 28 and 30, with at least one of the handles being oriented out of plane to the others. This assures stability because of reduced loads to devices 10 during transient accelerations and decelerations while the component is being moved. The bar is then laterally adjusted to align discrete clamping devices 10 to their respective lifting handles on the larger replacement component, and the devices are clamped in place. The larger replacement component is then positioned adjacent the satellite in the vicinity of the larger spent component by the Remote Manipulator Arm, and the astronaut replaces the spent component with the replacement component, clamping the spent component to the bar for stowage in the cargo bay.

In order to perform the aforementioned tasks of clamping and unclamping devices 10 to lifting handles 28 and 30 of the spent and replaced components, an astronaut first raises detent shaft 226 of device 10 and positions shoulders 232 of shaft 226 in groove 222, locking detent shaft 226 in the raised position. Operating handle 32 is then rotated to position detent assembly 36 between lock-release openings 38 and 42, respectively, or lock-release openings 40 and 44, respectively, depending on the thickness of the lifting handle to be clamped. It is to be noted that a pin 130 (FIGS. 2 and 3) set in lower side 172 of housing 46 engages a semicircular slot 132 in lower surface 134 of cam member 110. This pin and slot serve to limit the rotation of handle 32, preventing it from being rotated to a position where it would prevent a lifting handle from entering slot 14. The astronaut then moves the component to force the lifting handle on the component between angled faces 66 of latches 16 and 18, moving latches 16 and 18 apart against springs 96. After the handle passes between latches 16 and 18, it depresses button cap 152, and latches 16 and 18 close behind the handle, loosely clamping the handle between latches 16 and 18 and depressed button cap 152. In order to firmly secure the lifting handle in device 10, the astronaut rotates handle 32 in a direction which moves detent assembly 202 toward the appropriate lock opening in housing 46. This rotation causes one of the selected intermediate cam lobes 126 or 128 to urge clamp assembly 34 into clamping engagement with the lifting handle, firmly clamping it between clamp assembly 34 and latches 16 and 18. As thicknesses between various handles of the same relative size vary somewhat (±0.030" variance), intermediate cams 126 and 128 are profiled to force clamping assembly 34 into clamped engagement with a lifting handle short of where detent assembly 36 is aligned to engage one of lock openings 38 or 40. In order to lock handle 32 and clamp 34 in a desired position after clamping the lifting handle, the astronaut pushes operating handle 32 inward, decoupling handle 32 form cam member 110 as described while torsional spring 186 maintains a rotational force against cam member 110 in a direction which tends to force clamp assembly 34 against the lifting handle. Then the detent handle 240 is pulled upward and rotated 90° to allow detent end 238 of shaft 226 to rest on surface 198. The astronaut then continues to rotate handle 32 against torsional spring 186 the requisite distance to align detent shaft 226 with one of lock openings 38 or 40. When this alignment is achieved, detent shaft 226 engages the lock opening. In this manner, a lifting handle is firmly clamped in place, and operating handle 32 and cam member 110 are locked in position to prevent accidental release of the lifting handle.

To release a lifting handle, the astronaut lifts detent handle 240, disengaging detent end 238 of shaft 226 from a lock opening and rotates it 90° to once again engage shoulders 232 with groove 222. Operating handle 32 is then rotated to align detent shaft 226 with the appropriate release opening, which moves latches 16 and 18 apart as described while withdrawing clamp assembly 34. This allows the lifting handle to be moved out of slot 14, releasing the component from the bar mounted to the Remote Manipulator Arm. If desired, operating handle 32 may be locked in the release position by releasing detent shaft 226 into a release opening as described.

From the foregoing, it is apparent that the applicant has provided a clamping device which is simple to use in a microgravity environment and which further firmly clamps a lifting handle of a component to be moved. Additionally, the latches of this invention cannot be forced apart, as was the case with previously suggested clamping devices.

I claim:

1. An apparatus for selectively clamping a sized lifting member comprising
    a generally hollow housing having an end wall provided with a pair of extending side walls defining a clamping region, said side walls each having an opening therethrough, with said openings aligned about a common axis, and said end wall having a bore disposed normal to said axis;
    an inwardly biased latch member reciprocally mounted in each said opening and including a latch portion extending into said clamping region, said latch portions each having a tapered outer face for engagement by said lifting member for urging said latch portions out of said clamping region, whereby said lifting member is then received into said clamping region, after which said latch portions enclose said lifting member therein, and said latch portions each further including an inwardly facing first clamping face generally normal to said first bore, for clamped engagement with said lifting member;
    a pair of elongated linkage members mounted in spaced relation in said housing and having first and second ends, each linkage member being pivotally secured at said first end to one of said latch members and pivotally secured at said second end in said hollow housing, said linkage members each having an inwardly facing linkage cam follower disposed between said first and second ends;
    a clamp member disposed for selected movement in said bore and having a clamp cam follower on one end and a second clamping face on an opposite end for clampably engaging said lifting member;
    a cam member rotatably disposed in said housing and having a pair of first, like, opposed cam lobes disposed to bear on each said linkage cam follower, for simultaneously moving each said latch portion in said opening out of said clamping region, and further having a pair of second, dissimilar, opposed cam lobes positioned generally 90° from said pair of first cam lobes so that a selected one of said pair of second cam lobes bears on said clamp cam follower of said clamp member, for selectively moving said clamp member a predetermined distance into said clamping region, clamping a selected said lifting member between said first and second clamping faces of said latch member and said clamp member; and
    rotation means including a handle, connected to said cam member for rotating said cam member in a selected direction, said rotation means including means for decoupling said handle from said cam member while maintaining rotational bias thereon, said handle including locking means for locking said handle in a predetermined position over said housing, whereby as said handle is rotated to a selected side of said housing, decoupled from said cam member and locked in a said predetermined position, a lifting member of one thickness is clamped, and as said handle is rotated to the opposite side of said housing, decoupled and locked in another predetermined position, a lifting member of different thickness is clamped.

2. An apparatus as set forth in claim 1 wherein said rotation means comprises:
    a central opening in said cam member and a pin extending into said central opening;
    aligned openings in broad facing sides of said housing;
    a shaft extending through said broad facing sides and through said central opening and having a boss connected to one end for abutting an exterior of one of said broad facing sides, preventing said shaft from being pulled through said aligned openings and said central opening, said shaft being further provided with a longitudinal slot extending the width of said housing, for sliding engagement with said pin, and a circumferential slot extending around said shaft and being in communicating relation with an end of said longitudinal slot away from said one end of said shaft;
    a torsion spring disposed around a portion of said shaft in said central opening of said cam member, said torsion spring having one end anchored in said longitudinal slot, and an opposite end anchored to said pin;
    a first collar around said shaft a spaced distance from an exterior of an opposite broad facing side and a compression spring disposed between said first collar and said opposite broad facing side, for biasing said shaft so that said boss is in abutting relation with said one broad facing side; and
    said handle being coupled to an opposite end of said shaft, whereby rotational movement applied to said shaft is transferred by said pin to said cam member in one instance, and in another instance, said shaft may be pushed against spring bias of said compression spring through said housing and said central opening until said circumferential slot is aligned with said pin, with rotation causing said pin and said circumferential slot to become engaged while imparting torsion to said torsion spring, rotatably urging said cam member in a clamping direction with respect to said clamp member and said lifting member.

3. An apparatus as set forth in claim 2 wherein said handle locking means comprises:

an extension connected at one end to said first collar, said extension being disposed normal to said shaft and extending a distance short of said end wall of said clamping region so that said extension will not block said clamping region when rotatated therepast;

a tubular member having tubular upper and lower interior portions, said tubular member being coupled to an opposite end of said extension normal thereto, said tubular upper portion being elongated in cross section, and said tubular lower portion being circular in cross section;

a groove in an upper end of said tubular member, said groove disposed 90° with respect to said tubular upper portion;

a detent shaft slidably disposed in said tubular upper and lower portions, said detent shaft having a mating upper region being elongated in cross section and a lower, rod-shaped region having a detent end thereon, and a pair of shoulder positioned where said upper portion and said lower portion transition, said shoulder disposed to be fitted in said groove a second collar fitted around said rod-shaped region near said detent end and a spring positioned in said tubular lower portion of said tubular member, said spring disposed between said second collar and an upper end of said lower tubular portion, whereby said spring biases said detent end toward said opposite side of said housing;

a detent handle positioned on an end of said detent shaft opposite said detent end, whereby said detent shaft may be raised against bias of said spring and rotated to position said pair of shoulders in said groove, locking said detent shaft in a raised position, and said detent shaft may further be raised and rotated 90° to align said upper elongated region of said detent shaft with said tubular elongated upper region, allowing said detent end to be urged by said spring to a lowered position; and a series of openings in said opposite side of said housing, said openings being engageable with said detent end of said detent shaft, whereby when said detent end of said detent shaft is aligned and lowered into one of said opening, said detent handle is locked in a predetermined position which effects either a clamping configuration of said latch members and said clamping member or a releasing configuration of said latch members and said clamping member.

4. An apparatus as set forth in claim 1 wherein said clamp member includes a flange adjacent said cam follower and a spring disposed between said flange and an interior region of said end wall of said clamping region for inwardly biasing said clamp member, whereby said clamp cam follower is urged into continuous engagement with a selected one of said pair of second cam lobes.

5. An apparatus as set forth in claim 4 wherein said means for decoupling said handle includes a shaft having said handle mounted at one end and being coupled to said cam member proximate an opposite end, whereby as said handle is rotated in a selected direction, said clamp member is moved a predetermined distance into said clamping region to clamp said lifting member between said first and second clamping faces, and as said handle is rotated in an opposite direction, said clamp member is withdrawn from said clamping region, and continued rotation thereafter withdraws each said latch portion simultaneously from clamping region.

6. An apparatus as set forth in claim 5 wherein said means for locking said handle in a predetermined position locks said handle after said clamp member is in clamped engagement with a selected said lifting member.

7. An apparatus as set forth in claim 6 wherein each said inwardly facing linkage cam follower is longitudinally bisected, providing clearance for at least one lobe of said pair of second cam lobes.

8. An apparatus as set forth in claim 7 wherein said pair of first like, opposed, cam lobes each comprises upper and lower like profiled cams, with one of said pair of second, dissimilar, cam lobes axially disposed between each said upper and lower like profiled cams, whereby as said cam member is rotated, said upper and lower cam lobes bear on each portion of bisected said linkage cam follower, and a selected one of said pair of second cam lobes bears on said clamp cam follower.

* * * * *